United States Patent
Zhang et al.

(10) Patent No.: US 11,451,496 B1
(45) Date of Patent: Sep. 20, 2022

(54) INTELLIGENT, PERSONALIZED, AND DYNAMIC CHATBOT CONVERSATION

(71) Applicant: Microsoft Technology Licensing, LLC, Redmond, WA (US)

(72) Inventors: Yi Zhang, Kirkland, WA (US); Omar Aftab, Newcastle, WA (US); Eslam Kamal Abdelaal Abdelreheem, Sammamish, WA (US); Mohammed Mustafa Mohammed Ali Moussa, Cairo (EG); Senthilkumar Chandramohan, Sammamish, WA (US); Ahmed Mostafa Othman Abdelmotaleb, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/246,461

(22) Filed: Apr. 30, 2021

(51) Int. Cl.
  *G06F 15/16* (2006.01)
  *H04L 51/02* (2022.01)

(52) U.S. Cl.
  CPC ................... *H04L 51/02* (2013.01)

(58) Field of Classification Search
  CPC ........................................ H04L 51/02
  USPC ........................................... 709/206
  See application file for complete search history.

(56) References Cited

U.S. PATENT DOCUMENTS

| | | | |
|---|---|---|---|
| 2012/0041903 A1 | 2/2012 | Beilby et al. | |
| 2015/0186156 A1* | 7/2015 | Brown ............. | H04L 51/02 715/706 |
| 2017/0230312 A1* | 8/2017 | Barrett .................. | H04L 51/046 |
| 2017/0293851 A1 | 10/2017 | Chawla et al. | |
| 2018/0096072 A1 | 4/2018 | He et al. | |
| 2018/0332169 A1 | 11/2018 | Somech et al. | |
| 2019/0005021 A1 | 1/2019 | Miller et al. | |
| 2019/0273701 A1 | 9/2019 | Basheer et al. | |
| 2020/0005117 A1* | 1/2020 | Yuan ..................... | G06F 40/30 |
| 2020/0126540 A1* | 4/2020 | Panchamgam ....... | H04L 51/046 |
| 2020/0183928 A1 | 6/2020 | Wu | |
| 2020/0302123 A1* | 9/2020 | Mittal .................... | G06F 40/40 |

(Continued)

OTHER PUBLICATIONS

"A tour of Common Data Service (CDS) in the Power Platform with Doctor Flow", Retrieved from: https://powerusers.microsoft.com/t5/MBAS-Gallery-2020/A-tour-of-Common-Data-Service-CDS-in-the-Power-Platform-with/m-p/553651, May 8, 2020, 5 Pages.

(Continued)

*Primary Examiner* — Hee Soo Kim
(74) *Attorney, Agent, or Firm* — Chin IP, PLLC

(57) ABSTRACT

The disclosed technology is generally directed to chatbot conversation management. In one example of the technology, a generic model associated with a first property associated with a chatbot manager is received. The generic model is generated based on machine learning. A refined model that is associated with the first property is generated based on the generic model and a first plurality of phrases. A first conversation is held between a chatbot and an end user. Upon determining that the value of the first property for the end user is not stored in the database, via the chatbot, during the first conversation, the refined model is used to dynamically ask questions to the end user to determine a value of the first property for the end user. In a second conversation between the chatbot and the end user, the value of the first property for the end user is referenced.

20 Claims, 5 Drawing Sheets

(56) References Cited

U.S. PATENT DOCUMENTS

| | | | |
|---|---|---|---|
| 2021/0065705 A1 | 3/2021 | Ham et al. | |
| 2021/0073474 A1* | 3/2021 | Sengupta | H04L 51/02 |
| 2021/0150150 A1* | 5/2021 | Wu | G06F 16/3329 |
| 2021/0184876 A1* | 6/2021 | Kinsey | H04L 51/02 |
| 2021/0201144 A1* | 7/2021 | Jonnalagadda | G06F 40/35 |
| 2022/0108080 A1* | 4/2022 | Munavalli | G06F 40/35 |

OTHER PUBLICATIONS

"Getting Information form the common data service with power virtual agent", Retrieved from: https://powerusers.microsoft.com/t5/Calling-Actions-from-PVA/Getting-Information-form-the-common-data-service-with-power/m-p/567963, May 21, 2020, 12 Pages.

"Is it possible to reconnect the user to a conversation with a Power Virtual Agent and retain the context and previous chat history?", Retrieved from: https://powerusers.microsoft.com/t5/Publish-Channel-Management/Is-it-possible-to-reconnect-the-user-to-a-conversation-with-a/m-p/564087, May 18, 2020, 21 Pages.

"Power Virtual Agents—Reading CDS & Embedding in a Portal", Retrieved from: https://powerusers.microsoft.com/t5/Webinars-and-Video-Gallery/Power-Virtual-Agents-Reading-CDS-amp-Embedding-In-A-Portal/m-p/542169, Apr. 28, 2020, 4 Pages.

"Recover a Contacts username using PVA", Retrieved from: https://powerusers.microsoft.com/t5/General/Recover-a-Contacts-username-using-PVA/m-p/631456, Jul. 20, 2020, 18 Pages.

"Retrieve User Details in Virtual agent using flows", Retrieved from: https://powerusers.microsoft.com/t5/Calling-Actions-from-PVA/Retrieve-User-Details-in-Virtual-agent-using-flows/m-p/612008, Jun. 30, 2020, 5 Pages.

D'Souza-Wiltshire, et al., "Configure end-user authentication in Power Virtual Agents", Retrieved from: https://docs.microsoft.com/en-us/power-virtual-agents/configuration-end-user-authentication, Feb. 11, 2021, 15 Pages.

Lindhorst, et al., "Understand experimental, preview, and deprecated features in Power Apps", Retrieved from: https://docs.microsoft.com/en-us/powerapps/maker/canvas-apps/working-with-experimental-preview, May 4, 2020, 8 Pages.

Liu, et al., "Content-Oriented User Modeling for Personalized Response Ranking in Chatbots", In Journal of IEEE/ACM Transactions on Audio, Speech, and Language Processing, vol. 26, Issue 1, Jan. 2018, pp. 122-133.

Luo, et al., "Learning Personalized End-to-End Goal-Oriented Dialog", In Proceedings of the Thirty-Third AAAI Conference on Artificial Intelligence, vol. 33, Issue 01, Jul. 17, 2019, pp. 6794-6801.

M, Arjan, "Use Entities from CDS", Retrieved from: https://powerusers.microsoft.com/t5/Power-Virtual-Agents-Ideas/Use-Entities-from-CDS/idi-p/415436, Nov. 29, 2019, 8 Pages.

Pettere, et al., "Get a user", Retrieved from: https://docs.microsoft.com/en-us/graph/api/user-get?view=graph-rest-1.0&tabs=http, Mar. 11, 2021, 7 Pages.

Pettere, et al., "Working with users in Microsoft Graph", Retrieved from: https://docs.microsoft.com/en-us/graph/api/resources/users?view=graph-rest-1.0, Mar. 13, 2021, 4 Pages.

Thosani, et al., "A Self Learning Chat-Bot From User Interactions and Preferences", In Proceedings of the 4th International Conference on Intelligent Computing and Control Systems, May 13, 2020, pp. 224-229.

"International Search Report and Written Opinion Issued in PCT Application No. PCT/US22/023566", dated Jul. 11, 2022, 12 Pages.

\* cited by examiner

INTELLIGENT, PERSONALIZED, AND DYNAMIC CHATBOT CONVERSATION

BACKGROUND

Chatbots may be used to provide information to end users. For example, a chatbot may replace a text-based frequently asked questions (FAQ) facility on a web site. By using a chatbot in lieu of an FAQ facility, an end user may type a question and the chatbot will attempt to interpret it, and then provide an answer. In the context of an FAQ facility, if a user submits one of the frequently asked questions using words the same as or similar to the question, typically the chatbot will provide the prepared text answer; like a text-based FAQ facility but in the context of chat.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to chatbot conversation management. In some examples, a plurality of properties is associated with a first chatbot manager. In some examples, a first generic model that is associated with a first property of the plurality of properties is received. In some examples, the first generic model is generated based on machine learning. In some examples, a first plurality of phrases that is associated with the first property is received. In some examples, a first refined model that is associated with the first property is generated based on the first generic model and the first plurality of phrases. In some examples, a first conversation is held between a first chatbot and a first end user. In some examples, it is determined whether a value of the first property for the first end user is stored in a database. In some examples, upon determining that the value of the first property for the first end user is not stored in the database, via the first chatbot, during the first conversation, the first refined model is used to dynamically ask questions to the first end user to determine a value of the first property for the first end user. In some examples, the value of the first property for the first end user is stored in the database. In some examples, in a second conversation between the first chatbot and the first end user, the value of the first property for the first end user is referenced.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
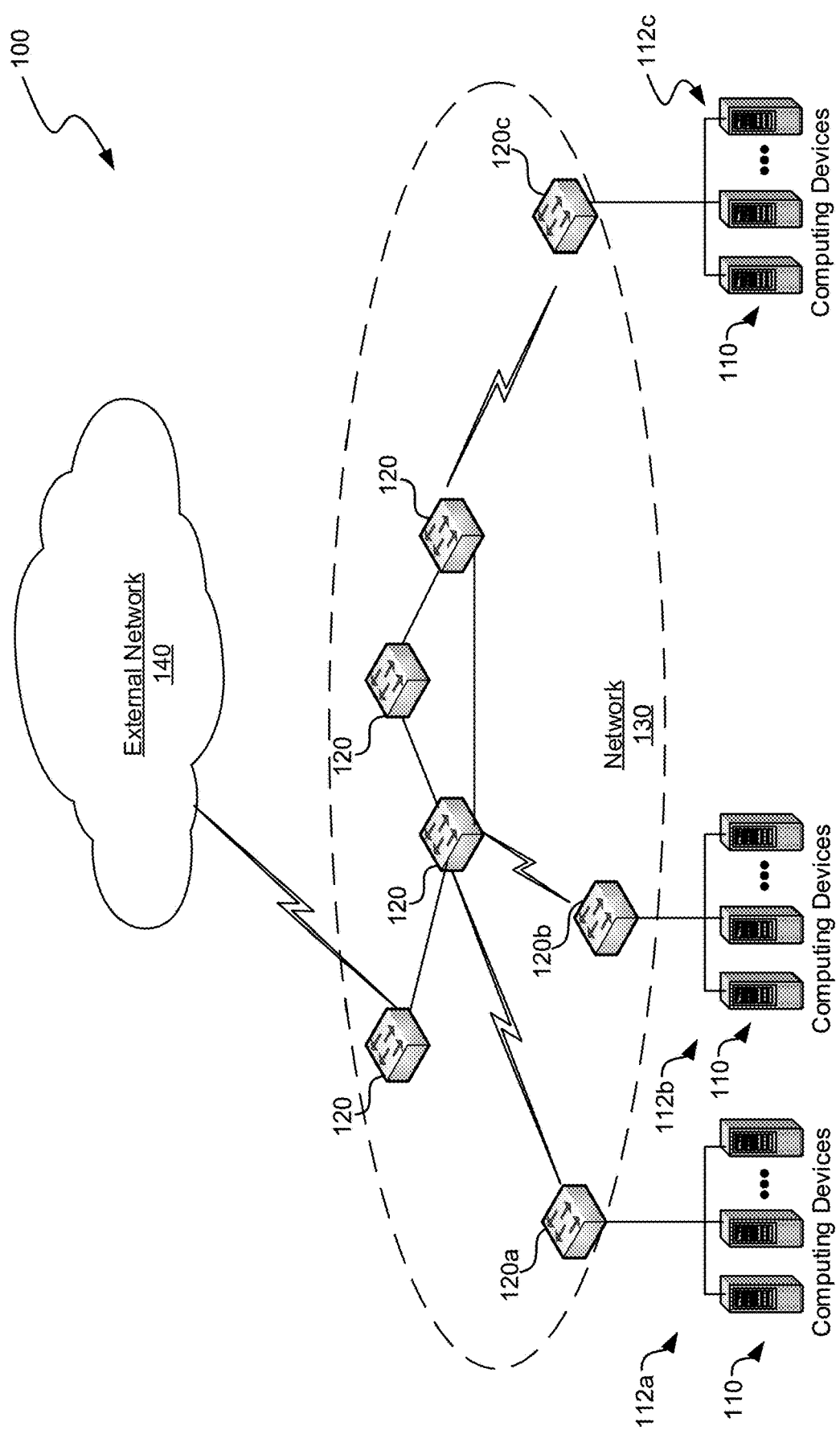
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks.

Briefly stated, the disclosed technology is generally directed to chatbot conversation management. In some examples, a plurality of properties is associated with a first chatbot manager. In some examples, a first generic model that is associated with a first property of the plurality of properties is received. In some examples, the first generic model is generated based on machine learning. In some examples, a first plurality of phrases that is associated with the first property is received. In some examples, a first refined model that is associated with the first property is generated based on the first generic model and the first plurality of phrases. In some examples, a first conversation is held between a first chatbot and a first end user. In some examples, it is determined whether a value of the first property for the first end user is stored in a database. In some examples, upon determining that the value of the first property for the first end user is not stored in the database, via the first chatbot, during the first conversation, the first refined model is used to dynamically ask questions to the first end user to determine a value of the first property for the first end user. In some examples, the value of the first property for the first end user is stored in the database. In some examples, in a second conversation between the first chatbot and the first end user, the value of the first property for the first end user is referenced.

In some examples, a platform is provided to enable chatbot managers to manage chatbots for conservations with end users. The term "chatbot manager" as used herein refers to one who authors, edits, or otherwise manages chatbots for conversations with end users. The platform may enable the chatbot to manage dynamic conversations with end users. In some examples, rather than adhering to a strict script, the chatbots may be capable of intelligent and dynamic conversations based on parameters provided by the chatbots users and based on the ongoing conversation between the chatbot and the end user. The intelligent and dynamic conversations may be based on an artificial intelligence (AI) model trained by machine learning.

In some examples, the chatbot manager may define one or more properties for end users. The properties may include an end user's name, job titles, birth date, phone number, zip code, the like, and/or any suitable variable to be associated with the end user. The chatbot manager may be prompted to provide at least five trigger phrases for each variable. After the trigger phrases are provided, the platform may fine-tune and/or refine the AI model with regard to the provided trigger phrases without needing additional training. In this manner, where suitable, the chatbot may dynamically and intelligently request a particular property from the end user when appropriate. The chatbot may skip questions about a particular property when the particular property for the user is already known.

The properties determined for the end user, and other information for the end user, may be stored in a database for use in subsequent conversations between the chatbot and the end user. Other information stored for the end user may include the context of the end user's previous chatbot conversations and other interactions made by the end user, including, for example, past purchases made by the end user. The chatbot may make use of its AI models, including the refined models for particular properties, and information stored for the end users, to enhance and deeply personalize future conversations between the chatbot and the end user. This may enable unification of fragmented interactions between a brand and user: post-sale, pre-sale, and/or across various interaction points.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices no and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices no may be individually configured to provide computing, storage, and/or other suitable computing services.

In some examples, one or more of the computing devices no is a device that is configured to provide a platform for the management of intelligent, dynamic, and personalized chatbot conversations.

Illustrative Computing Device

Figure 2:
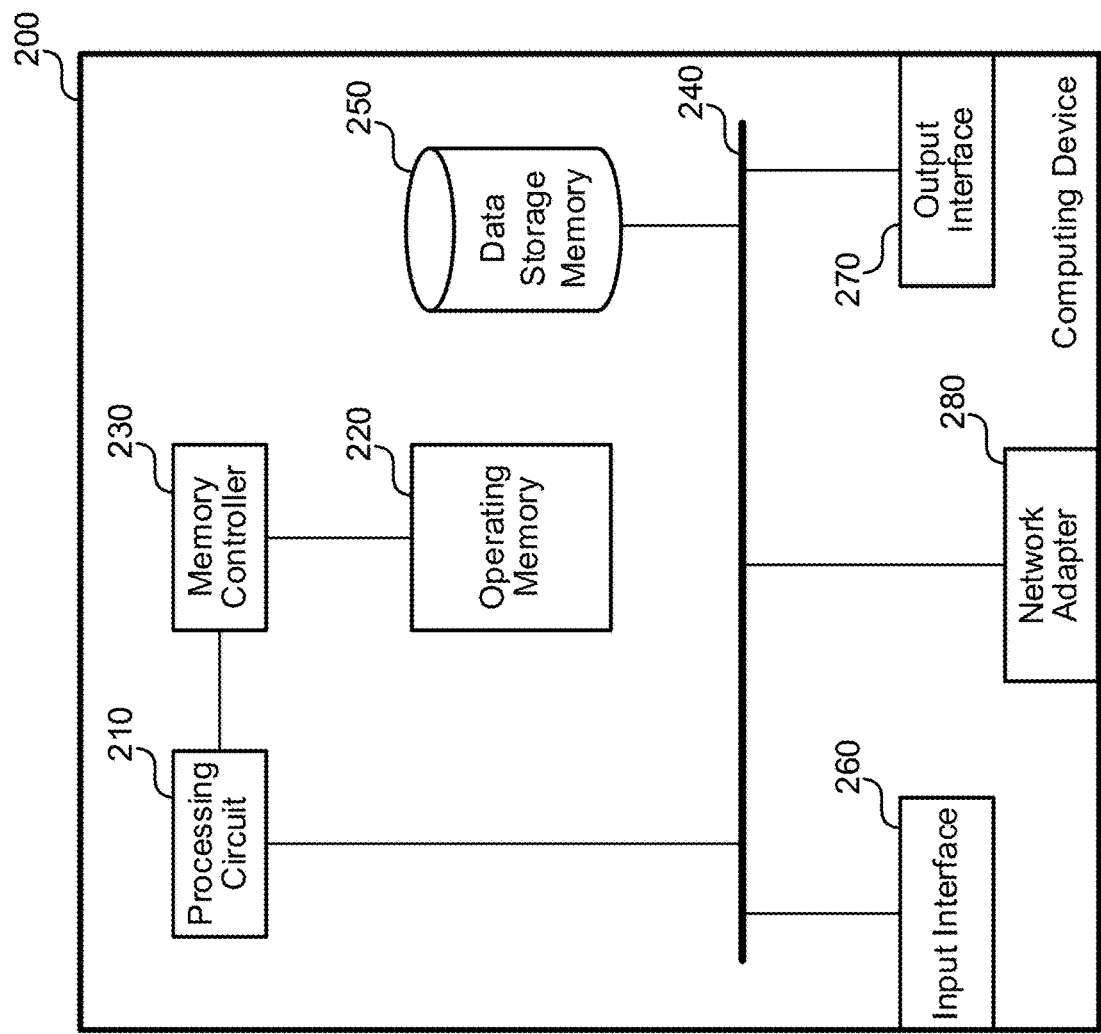
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of computing device 110 or network node 120 of FIG. 1. Likewise, computer device 200 may be an example any of the devices, a device within any of the distributed systems, illustrated in or referred to in FIG. 3, FIG. 4, and/or FIG. 5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include 4th generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point-to-point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter (UART), a Serial Peripheral Interface (SPI), Inter-Integrated Circuit (I2C), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 5:
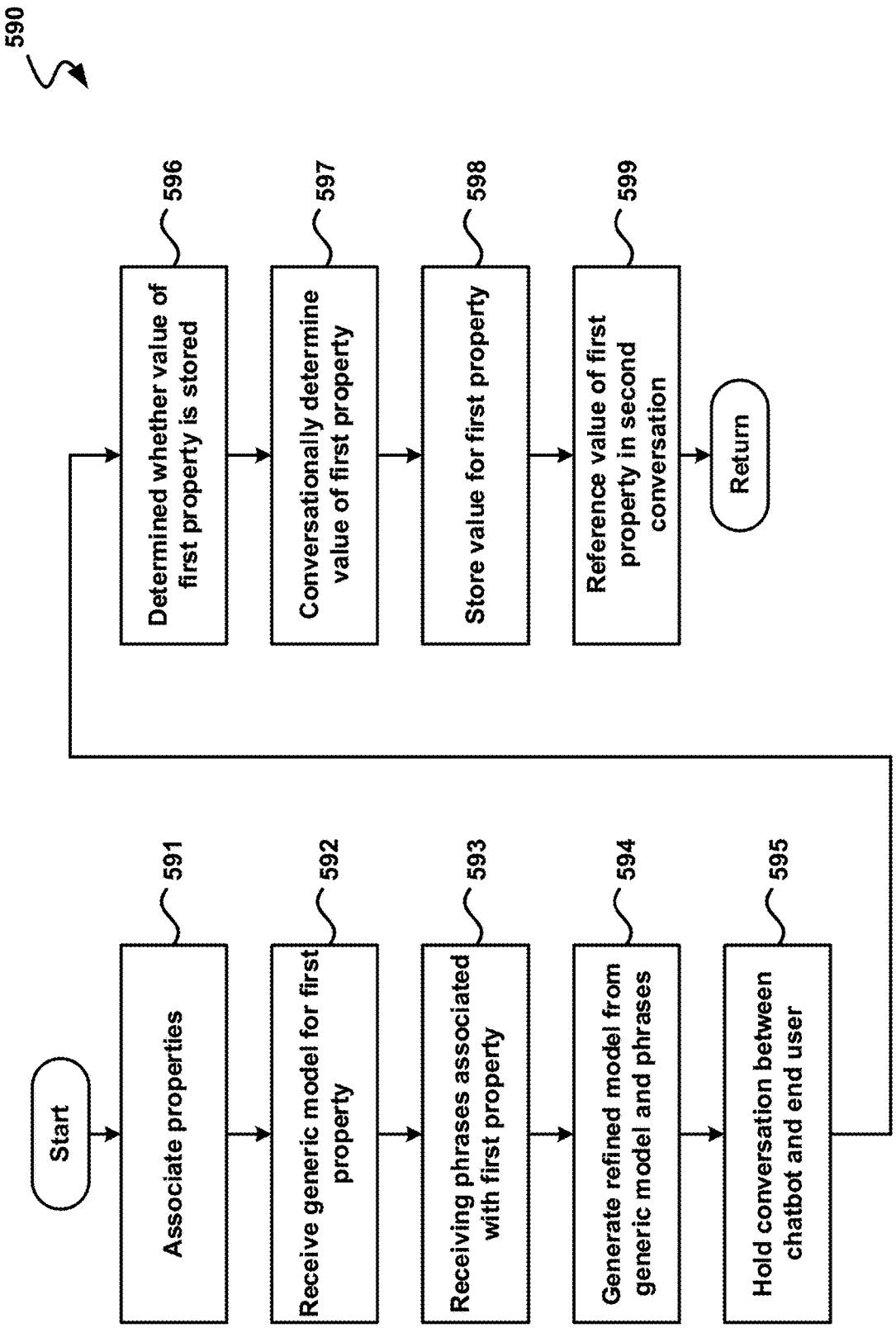
FIG. 5 is a flow diagram illustrating an example process for chatbot conversation management, in accordance with aspects of the present disclosure.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, where the actions may include, in some examples, actions for one or more processes described herein, such as, in one example, process 500 of FIG. 5, which is discussed in greater detail below.

Illustrative System

Figure 3:
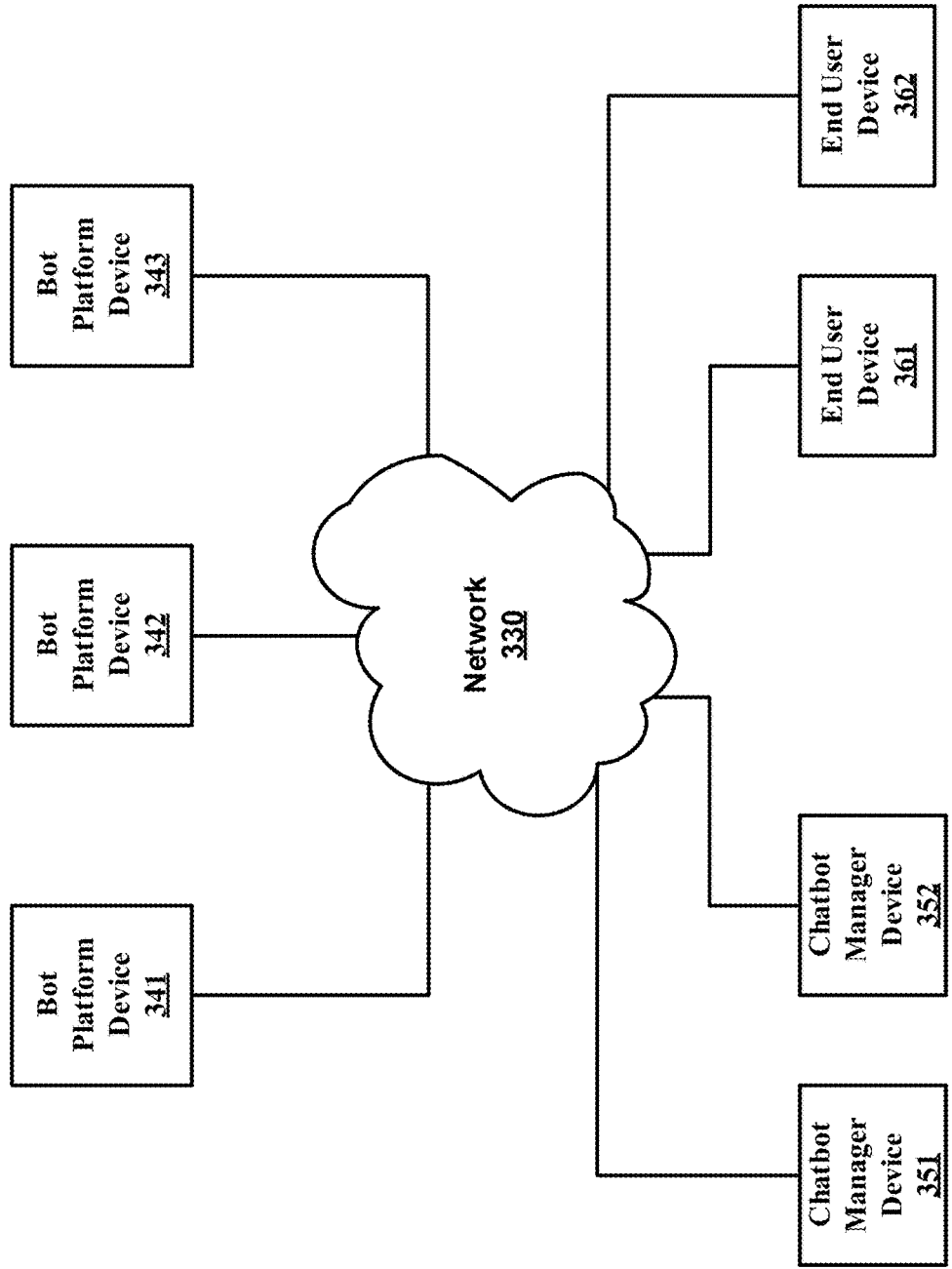
FIG. 3 is a block diagram illustrating an example of a network-connected system.

FIG. 3 is a block diagram illustrating an example of a system (300). System 300 may include network 330, as well as chatbot platform devices 341, 342, and 343; chatbot manager devices 351 and 352; and end user devices 361 and 362, which, in some examples, all connect to network 330.

Each of chatbot platform devices 341, 342, and 343; chatbot manager devices 351 and 352; and end user devices 361 and 362 may include examples of computing device 200 of FIG. 2. FIG. 3 and the corresponding description of FIG. 3 in the specification illustrates an example system for illustrative purposes that does not limit the scope of the disclosure.

In some examples, chatbot manager devices 351 and 352 include devices operated by chatbot managers, and end user devices 361 and 362 include devices operated by end users. In some examples, chatbot platform devices 341, 342, and 343 are devices that provide one or more services, including chatbot services, to chatbot managers, which chatbot managers may use to manage chatbot conversations with between chatbots and end users.

In some examples, chatbot platform devices 341, 342, and 343 are part or all of one or more distributed systems that are configured to perform one or more functions, including one or more services to chatbot manager devices 351 and 352. In some examples, one or more distributed systems that includes chatbot platform devices 341, 342, and 343 performs actions, where the actions may include, in some examples, actions for one or more processes described herein, such as, in one example, process 500 of FIG. 5, which is discussed in greater detail below.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. In essence, network 330 includes any communication method by which information may travel among chatbot platform devices 341, 342, and 343; chatbot manager devices 351 and 352; and end user devices 361 and 362. Although each device is shown connected as connected to network 330, that does not mean that each device communicates with each other device shown. In some examples, some devices shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown instead communicating with each other with a different network of the multiple networks.

System 300 may include more or less devices than illustrated in FIG. 3, which is shown by way of example only.

Figure 4:
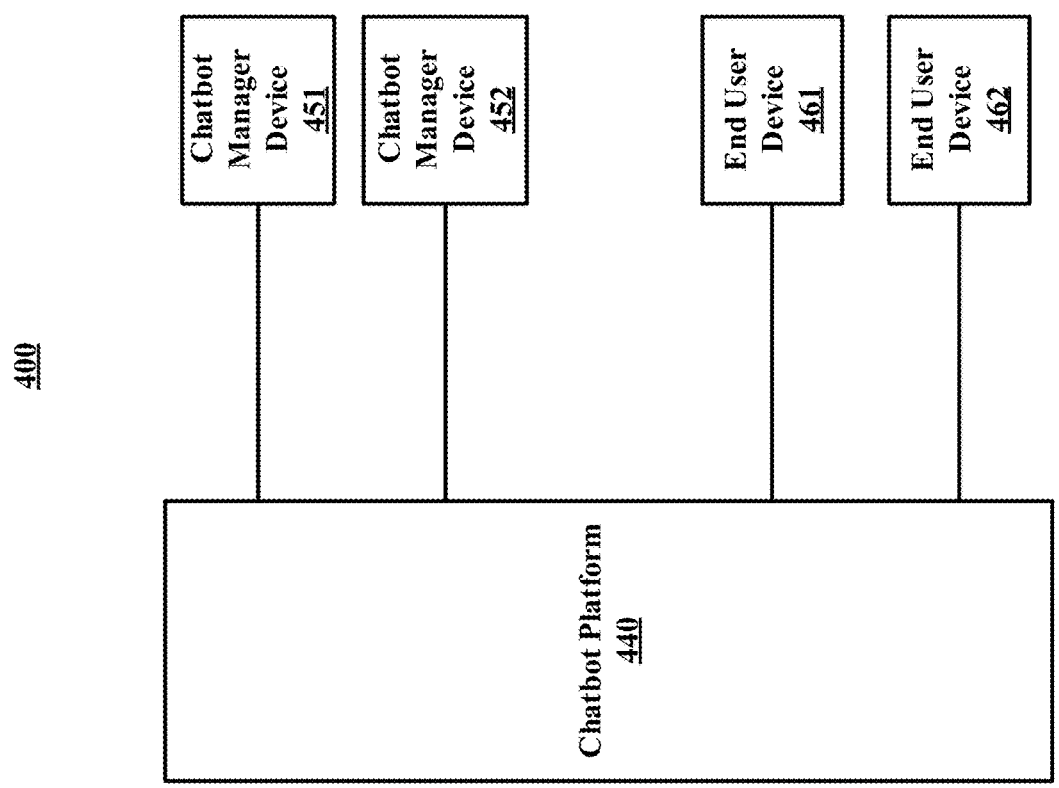
FIG. 4 is a block diagram illustrating an example of a system for chatbot conversation management.

FIG. 4 is a block diagram illustrating an example of a system (400). System 400 may be an example of system 300 of FIG. 3, or vice versa. System 400 may include chatbot platform 440, chatbot manager devices 451 and 452, and end user devices 461 and 462. In some examples, chatbot platform 440 includes one or more distributed systems that may include examples of chatbot platform devices 341, 342, and 343 of FIG. 3. Chatbot manager devices 451 and 452 may include examples of chatbot manager devices 351 and 352 of FIG. 3. End user devices 361 and 362 may include examples of end user devices 361 and 362 of FIG. 3.

In some examples, chatbot manager devices 451 and 452 include devices operated by chatbot managers, and end user devices 461 and 462 include devices operated by end users. In some examples, chatbot platform 440 provides one or more services, including chatbot services, to chatbot managers, which chatbot managers may use to manage chatbot conversations with between chatbots and end users. Each chatbot manager may be a separate tenant of services provide by chatbot platform 440.

System 400 may include more or less devices than illustrated in FIG. 4, which is shown by way of example only. Although not shown in FIG. 4, in some examples, communications may also occur directly between the chatbot manager devices (e.g., 451 and 452) and the end user devices (e.g., 461 and 462).

Chatbot managers or one or more entities managing the chatbot managers may directly or indirectly provide various services, products, and/or the like to end users, and may manage chatbot conservations with end users, for various purposes including providing customer service to end users via the chatbot conversations.

In some examples, an end user need not log on in order to make use of personalized chatbot conversations. In other examples, an end user must log on in order to make use of personalized chatbot conversations. Examples that require that an end user log on in order to enable personalized chatbot services may help ensure user privacy, so that, for example, personal information related to one end user is not leaked to a different end user. In some examples, a user log on may enable an end user to make use of personalized chatbot conservations with the log in also logging the user on to other services associated with the chatbot manager or an entity that is associated with the chatbot manager.

In some examples, the chatbots may make use of one or more AI models trained by machine learning to provide intelligent and dynamic conversations with end users. The AI models may include a natural language processing model.

In some examples, the chatbot manager may specify one or more properties for end users. The properties may include, an end user's name, job titles, birth date, phone number, zip code, the like, and/or any suitable variable to be associated with the end user. Each property may be a key-value pair, in which the name of the particular property is the key, and the corresponding value of that property for the end user is the value.

For example, the property having the property name "name" may have a key, "name," and a corresponding value, such as "John Smith." Each chatbot manager may define a set of properties for that chatbot manager. Then for each end user associated with the chatbot manager, each property may have a corresponding value for the end user, although the value may not be known until the value is communicated by the end user. As discussed above and below, the value for some of the properties may be determined in a conversational manner from end users based on dialog between the chatbot and the end user.

Some or all of the chatbot managers may be prompted to provide at least five trigger phrases for each property associated with that chatbot manager. In other examples, another quantity of trigger phrases may be used for some or all properties associated with various chatbot managers. For example, at least six trigger phrases may be used for one property, three or less trigger phrases may be used for another property, and four trigger phrases may be used for yet another property. However, any suitable number of trigger phrases may be used in other examples. Some of the AI models used by the chatbot may be generic models from which a refined model may be generated for each of the properties based on the provided trigger phrases. Herein, the term "generic model" refers to an AI model that has not been fine-tuned or refined based on trigger phrases or the like.

After the trigger phrases are provided, the platform may fine-tune and/or refine the AI model with regard to the provided trigger phrases without the need of additional training to so refine the model. In some examples, rather than using additional training to refine the model, the generic model is used in conjunction with the provided trigger phrases based on intelligence and natural language processing that is used to determine whether the user has asked a question, made a statement, or the like that has similarity to one of the trigger phrases. In some examples, the trigger phrases help the chatbot attribute corresponding properties based on the end user input.

In some examples, when a conversation is to occur between a chatbot and a particular end user, the identity of the end user is determined in a suitable manner. In some examples in which the end user logs in before communicating with the chatbot, the identity of the user is determined based on the log in. In some examples, chatbot platform 440 may store and maintain one or more database that includes various information, including information usable by chatbots in conversations between chatbots and end users.

In some examples, the database may be at least in part a graph database that stores a user graph for each end user, for use by chatbots when having conversations with end users, and which enable the chatbots to track information across multiple conversations. In some examples, once the identity of the end user is determined, the chatbot determines information about the user from multiple sources, including the user graph stored for the end user in a database maintained in chatbot platform 440. In some examples, once the identity of the end user is determined, and information about the user has been determined, the conversation can be personalized for the particular end user with which the chatbot is conversing.

Where suitable, during the conversation between the chatbot and the end user, the chatbot may dynamically and intelligently request a particular property from the end user when appropriate. The chatbot may determine properties from the user via dialog in a conversational manner, and can intelligently and dynamically determine which properties to ask for based on the context. The properties may act as context variables for the chatbot to use in an intelligent and dynamic manner. The chatbot may skip questions about a particular property when the particular property for the user is already known.

The property values determined for the end user, and other information for the end user, may be stored in a database for use in subsequent conversations between the chatbot and the end user. Other information stored for the end user may include the context of the end user's previous chatbot conversations and other interactions made by the end user, including, for example, past purchases made by the end user. The chatbot may make use of its AI models, including the refined models for particular properties, and information stored for the end users, to enhance and deeply personalize future conversations between the chatbot and the end user. This may enable unification of fragmented interactions between a brand and user: post-sale, pre-sale, and/or across various interaction points.

In some examples, through the course of one or more conversations with an end user, a chatbot can build up a user graph in a database stored in chatbot platform 440 and use the user graph to store values of properties for the end user for use in later conversation with the end user without having to prompt the end user again for the value of the property. In some examples, the personalized chatbot services may make use of information associated with other services and/or applications that are associated with the chatbot manager or an entity associated with the chatbot manager. In some examples, the data stored in the user graph can be used by other application and services, and the user graph can be populated by fetching and aggregating information about the end user, including information from other applications and services.

Various information saved in one or more databases in chatbot platform 441 may be used in conjunction with the refined models for the properties to provide to the end users chatbot conversations that are deeply personalized, dynamic, not adhering to a rigid script, and using all the information that chatbot platform 440 has about the end user.

In some examples, the chatbot may allow an end user to opt in or opt out of features associated with the personalized conversation. For example, an end user may be prompted as to whether the end user wishes the chatbot to remember information from this conversation in future conversations. In these examples, if the end user indicated that the end user does not wish the information to be remembered, then the information, including the property values for the end user, are not stored in the user graph in the database. In these examples, if instead the end user gave consent to remember information, when a property value is determined for the end user, the property value is stored in the user graph in the database.

In some examples, during a chatbot conversation with the end user, the chatbot will intelligently prompt the user for relevant information, including intelligently prompting the user for a property value for the end user when the questions map to a particular user property. In some examples, the chatbot can use dynamic conversation routing based on the end user context, including dynamically skipping questioning for the value of properties or other information associated with an end user that is already known. Also, the intelligent and dynamic dialog traversal performed by the chatbot may include prompting to overwrite existing property values.

For example, if it appears based on the conversation that a particular property value for the end user has changed, the chatbot may verify through dialog with the end user that the property value has changed. In some examples, the chatbot remembers the end user and retains context information throughout a conversation and across conversations with the end user. The context information may include the properties, the end user's past purchases, and previous conversations between the chatbot and the end user.

In some examples, the chatbot can use the stored information, including information associated with the end user's past interactions, to dynamically resume a conversation from where the conversation left off.

FIG. 5 illustrates an example dataflow for a process (590) for chatbot conversation management. In some examples, process 590 is performed by a device, distributed system, or the like, such as, for instance, device 200 of FIG. 2, chatbot platform device 341 of FIG. 3, chatbot platform 440 of FIG. 4, or the like.

In the illustrated example, step 591 occurs first. At step 591, in some examples, a plurality of properties is associated with a first chatbot manager. As shown, step 592 occurs next in some examples. At step 592, in some examples, a first generic model that is associated with a first property of the plurality of properties is received. In some examples, the first generic model is generated based on machine learning. As shown, step 593 occurs next in some examples. At step 593, in some examples, a first plurality of phrases that is associated with the first property is received.

As shown, step 594 occurs next in some examples. At step 594, in some examples, a first refined model that is associated with the first property is generated based on the first generic model and the first plurality of phrases. As shown, step 595 occurs next in some examples. At step 595, in some examples, a first conversation is held between a first chatbot and a first end user. As shown, step 596 occurs next in some examples. At step 596, in some examples, it is determined whether a value of the first property for the first end user is stored in a database.

As shown, step 597 occurs next in some examples. At step 597, in some examples, upon determining that the value of the first property for the first end user is not stored in the database, via the first chatbot, during the first conversation, the first refined model is used to dynamically ask questions to the first end user to determine a value of the first property for the first end user. At step 598, in some examples, the value of the first property for the first end user is stored in the database. As shown, step 599 occurs next in some examples. At step 599, in some examples, in a second conversation between the first chatbot and the first end user, the value of the first property for the first end user is referenced. The process may then advance to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
at least one memory adapted to store run-time data, and at least one processor that is adapted to execute processor-executable code that, in response to execution, enables the apparatus to perform actions, including:
associating a plurality of properties with a first chatbot manager;
receiving a first generic model that is associated with a first property of the plurality of properties, wherein the first generic model is generated based on machine learning;
receiving a first plurality of phrases that is associated with the first property;
generating a first refined model that is associated with the first property based on the first generic model and the first plurality of phrases;
holding a first conversation between a first chatbot and a first end user;
determining whether a value of the first property for the first end user is stored in a database;
upon determining that the value of the first property for the first end user is not stored in the database, via the first chatbot, during the first conversation, using the first refined model to dynamically ask questions to the first end user to determine a value of the first property for the first end user;
storing the value of the first property for the first end user in the database; and
in a second conversation between the first chatbot and the first end user, referencing the value of the first property for the first end user.

2. The apparatus of claim 1, wherein storing the value of the first property for the first end user in the database includes storing the value in a graph that is stored in the database, wherein the graph is associated with the first end user.

3. The apparatus of claim 1, wherein the first property is at least one of a user name, a user email, a user job title, a user birth date, a user phone number, or a user zip code.

4. The apparatus of claim 1, wherein the first plurality of phrases are provided by the first chatbot manager.

5. The apparatus of claim 1, wherein the first generic model is generated based on training, and wherein the first refined model does not use additional training beyond the training of the first generic model.

6. The apparatus of claim 1, the actions further including asking for consent from the end user to store the value of the first property for the first end user in the database.

7. The apparatus of claim 1, the actions further including:
enabling the first chatbot manager to specify a second property of the plurality of properties.

8. The apparatus of claim 7, the actions further including:
  determining whether a value of the second property for the first end user is stored in the database; and
  if it is determined that the value of the second property for the first end user is not stored in the database:
    via the first chatbot, using the first refined model to dynamically ask questions to the first end user to determine the value of the second property for the first end user,
  else
    skipping questions to the first end user to determine the value of the second property for the first end user.

9. A method, comprising:
  receiving a first plurality of phrases that is associated with a first property of a plurality of phrases that is associated with a first chatbot manager;
  determining a first refined model that is associated with the first property based on a first generic model and the first plurality of phrases, wherein the first generic model is based on machine learning;
  enabling a first conversation between a first chatbot and a first end user;
  determining whether a value of the first property for the first end user is stored in a database;
  upon determining that the value of the first property for the first end user is not stored in the database, via the first chatbot, during the first conversation, using the first refined model to dynamically query to the first end user to determine a value of the first property for the first end user;
  storing the value of the first property for the first end user in the database; and
  using the value of the first property for the first end user in a second conversation between the first chatbot and the first end user.

10. The method of claim 9, wherein storing the value of the first property for the first end user in the database includes storing the value in a graph that is stored in the database, wherein the graph is associated with the first end user.

11. The method of claim 9, wherein the first property is at least one of a user name, a user email, a user job title, a user birth date, a user phone number, or a user zip code.

12. The method of claim 9, wherein the first plurality of phrases includes multiple triggers phrases that are provided by the first chatbot manager.

13. The method of claim 9, further comprising:
  enabling the first chatbot manager to specify a second property of the plurality of properties.

14. The method of claim 13, further comprising:
  determining whether a value of the second property for the first end user is stored in the database; and
  if it is determined that the value of the second property for the first end user is not stored in the database:
    via the first chatbot, using the first refined model to dynamically ask questions to the first end user to determine the value of the second property for the first end user,
  else
    skipping questions to the first end user to determine the value of the second property for the first end user.

15. A processor-readable storage medium, having stored thereon processor-executable code that, upon execution by at least one processor, enables actions, comprising:
  storing property names for a plurality of properties with a first chatbot manager;
  receiving a first generic model that is associated with a first property of the plurality of properties, wherein the first generic model is created based on machine learning;
  receiving a first plurality of phrases that is associated with the first property;
  creating a first refined model that is associated with the first property based on the first generic model and the first plurality of phrases;
  managing a first conversation between a first chatbot and a first end user;
  determining whether a value of the first property for the first end user is stored in a database;
  upon determining that the value of the first property for the first end user is not stored in the database, via the first chatbot, during the first conversation, using the first refined model to dynamically question to the first end user to determine a value of the first property for the first end user;
  saving the value of the first property for the first end user in the database; and
  in a second conversation between the first chatbot and the first end user, retrieving the value of the first property for the first end user for use in the second conversation.

16. The processor-readable storage medium of claim 15, wherein saving the value of the first property for the first end user in the database includes storing the value in a graph that is stored in the database, wherein the graph is associated with the first end user.

17. The processor-readable storage medium of claim 15, wherein the first property is at least one of a user name, a user email, a user job title, a user birth date, a user phone number, or a user zip code.

18. The processor-readable storage medium of claim 15, wherein the first plurality of phrases includes at least five triggers phrases that are provided by the first chatbot manager.

19. The processor-readable storage medium of claim 15, the actions further comprising:
  enabling the first chatbot manager to specify a second property of the plurality of properties.

20. The processor-readable storage medium of claim 19, the actions further comprising:
  determining whether a value of the second property for the first end user is stored in the database; and
  if it is determined that the value of the second property for the first end user is not stored in the database:
    via the first chatbot, using the first refined model to dynamically ask questions to the first end user to determine the value of the second property for the first end user,
  else
    skipping questions to the first end user to determine the value of the second property for the first end user.

* * * * *